(12) United States Patent
Goebel

(10) Patent No.: US 8,013,998 B2
(45) Date of Patent: Sep. 6, 2011

(54) METHOD AND ARRANGEMENT FOR RECOGNITION OF OPTICAL RADIATION

(75) Inventor: Klaus R. Goebel, Darmstadt (DE)

(73) Assignee: Ingenieurburo Goebel GmbH, Darmstadt (DE)

( * ) Notice: Subject to any disclaimer, the term of this patent is extended or adjusted under 35 U.S.C. 154(b) by 971 days.

(21) Appl. No.: 11/937,023

(22) Filed: Nov. 8, 2007

(65) Prior Publication Data

US 2010/0277736 A1 Nov. 4, 2010

(30) Foreign Application Priority Data

Aug. 31, 2007 (DE) ................... 20 2007 012 255 U

(51) Int. Cl.
*G01N 21/00* (2006.01)
*G01J 3/30* (2006.01)
(52) U.S. Cl. ........ 356/434; 356/317; 356/435; 250/221; 250/437
(58) Field of Classification Search .......... 356/317–318, 356/432–435; 250/221, 557, 573, 578, 430, 250/347, 432
See application file for complete search history.

(56) References Cited

U.S. PATENT DOCUMENTS

| 4,290,043 | A | * | 9/1981 | Kaplan | 340/984 |
| 4,514,625 | A | * | 4/1985 | Heiland | 250/221 |
| 4,730,113 | A | * | 3/1988 | Edwards et al. | 250/347 |
| 5,004,922 | A | * | 4/1991 | Edwards | 250/340 |
| 5,486,691 | A | * | 1/1996 | Dieterle | 250/221 |
| 6,479,833 | B1 | * | 11/2002 | Pfefferseder et al. | 250/573 |

FOREIGN PATENT DOCUMENTS

| DE | 3638874 | 5/1987 |
| DE | 8908806 | 10/1989 |
| DE | 19629037 | 7/1997 |
| DE | 19940476 | 4/2001 |
| DE | 10017284 | 6/2001 |
| DE | 10325906 | 12/2004 |
| EP | 0321965 | 3/1992 |
| GB | 2171513 | 0/1886 |

* cited by examiner

*Primary Examiner* — Sang Nguyen
(74) *Attorney, Agent, or Firm* — Dennison, Schultz & MacDonald

(57) ABSTRACT

The invention relates to a method and an arrangement (10) for detecting the penetration of optical radiation (12) in a sectional area (20) of a protective wall system (18) in which at least one receiver (22) is located. The receiver is connected to an evaluation circuit (24). To recognize the failure of an inner protective wall it is suggested that the outer wall (16) of the protective wall system has a breach (26) for a transmitter/receiver unit (28), consisting of a number of receivers (22) located on the circumferential side of a tubular jacket (30) and a number of transmitters (32) concentrically surrounding the receivers (22) in a circle.

12 Claims, 5 Drawing Sheets

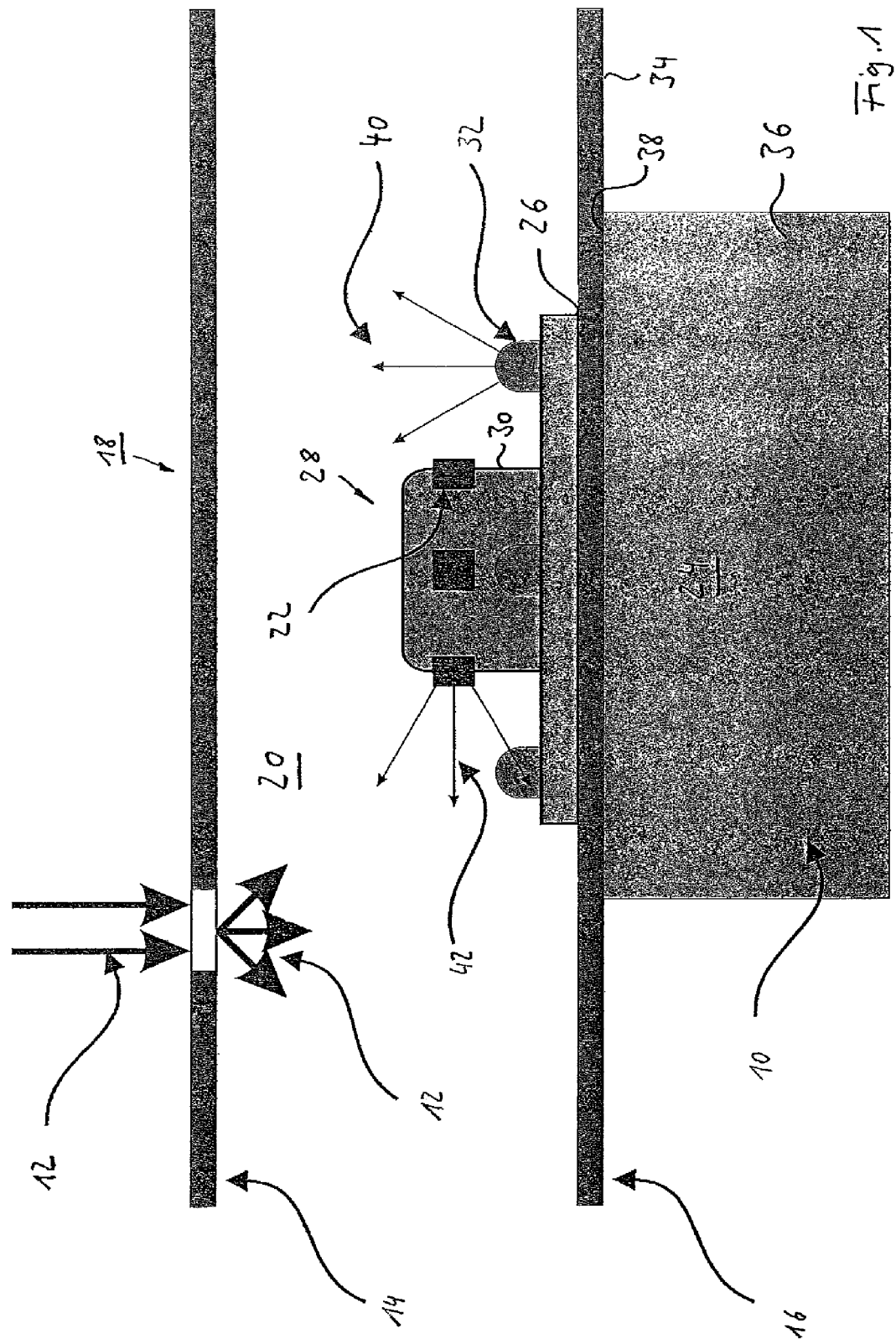

METHOD AND ARRANGEMENT FOR RECOGNITION OF OPTICAL RADIATION

BACKGROUND OF THE INVENTION

This invention is based on a method for detecting optical radiation such as laser radiation in at least one defined sectional area of a protective housing, whereby the optical radiation is detected by a receiver supplied with a reference radiation emitted by a transmitter. The invention is also based on an arrangement for detecting penetration of optical radiation, particularly continuously or pulsed laser radiation in a sectional area limited by at least one of two walls of a housing of a protective wall system in which at least one receiver is located for detection of the radiation and this receiver is connected to an evaluation circuit.

State-of-the-art high performance lasers are used for processing material in industrial production. Portal systems and robot systems provide users with maximum flexibility for guiding the laser beam in relation to the work. If it is possible to guide the laser energy to the processing location using fiber optic cable, it would be possible to significantly improve the dynamics of such systems. For safety of life and limb, passive (absorbing) protective walls, usually of metal, are constructed using single plates or a number of plates located behind one another around the laser area, the so-called housing. Laser radiation occurs with extremely high energy density within these protective walls.

Processing of parts also results in uncontrolled reflections. Direct or indirect laser radiation, in the worst case, the untreated beam, strikes the housing, which has the purpose of providing protection to humans outside against such radiation. It is necessary to ensure this protection for a period of time t, depending on the operating mode of the laser system, i.e. to allow the user time to recognize the fault and shut down the system. Due to the high laser energy and the frequently low distances to the protective wall, this period of time t until shut off is decreased continuously, or the material requirements placed on the housing increase continuously. For this reason, walls with exclusively passive effect are only suitable for protecting humans to a limited extent.

Patent publications DE 100 17 284 C1, DE 103 25 906 A1, DE 196 29 037 C1 are based on purely passive protection by different versions of certain characteristics and intermediate spaces between the walls. Various heat conduction properties or reflection capabilities are utilized for realization of such passive radiation safety. In practice, however, the surfaces of the protective walls are contaminated by oil, dirt and dust within a short time to such an extent that the original properties of the protective devices are no longer present.

DE 36 38 874 C2 describes an active process, whereby the inner wall facing the laser is equipped with an electrically active conductor, similar to a melting type fuse. In comparison to the arrangement described here, safe function is ensured only when the absorption characteristics of the inner wall are matched exactly to the wave length of the laser and an electrically active safety feature is also included. In order to use this system for items such as fiber lasers with extremely small beam diameter, it would be necessary to embed the electrical conductor in the wall in a very close meandering pattern which would result in high design requirements and costs.

DE 89 08 806 U describes an arrangement nearly identical to that described above.

DE 199 40 476 A1 describes an active arrangement for recognition of optical radiation by means of a type of sensor. However, in this process, the design of the protective wall is a significant part of the function. The use of heat sensors on a wall facing the laser requires a significant number of sensors for reliable switch-off, depending on the heat conducting characteristics of the wall material. The version described equipped with optical sensors and a perforated sheet metal wall equipped with a foil on the inside requires specially designed wall elements for its part.

An arrangement, as well as method for detecting a laser beam which escapes from a working area, are known from EP-B-0 321 965. Here, the working area is surrounded by a wall, in which a detector is located, with which the illumination is measured, which is generated by the laser beam as it strikes the wall. To check the sensor, the surrounding housing has a cutout in which a photo emitter is located whose radiation is received by the receiver for checking the function of the latter.

A safety system for checking laser beams is described in GB-A-2 171 513. Here, the laser beam is detected by means of a receiver. An infrared light source, whose radiation is detected by the receiver, is provided for checking the functional capability of the receiver.

SUMMARY OF THE INVENTION

The invention is based on the technical purpose of reliably allowing and appropriately evaluating an active method and an arrangement for recognition of failure of the inner protective wall. The method and the arrangement should be independent of the design of the protective wall and the material used for this wall and, in particular, be capable of being retrofitted in systems already in use.

The invention solves this problem using an arrangement of the type mentioned at the beginning, which possesses a transmitter/receiver unit consisting of receivers located on a tubular or cylindrical jacket and transmitters surrounding the jacket passing through the outer wall of the housing. Particularly the receivers are arranged geometrically on a circumferential line running parallel to the circumferential surface of the tubular jacket, therefore in the case of a cylindrical jacket concentric to the latter in a circle.

As an active sensor system, the transmitter/receiver unit detects erroneous radiation within a fraction of a second and triggers a safety circuit, for example on the laser system. The transmitter/receiver unit monitors the sectional area, i.e. the hollow space between the walls of the housing on a double-wall booth element. As soon as lasers radiation enters this hollow space, the receiving elements actuate triggering the safety circuit for the laser system.

To allow compact design of the arrangement and ensure easy assembly on already existing double wall cabinet elements, provisions have been made to locate the transmitter/receiver unit on the bottom of a housing containing the evaluation circuit, whereby the bottom of the housing is in contact with the outer surface of the wall of the housing and can be fastened to the latter.

This version allows a modular design of safe housings and laser cabinets. Economical standard cabinet elements can be used instead of expensive special housings.

In particular, thin, double-wall protective walls could also be used even for high laser outputs, whereby low material costs and simple assembly with minimum space requirements can be achieved regardless of the laser power used.

Moreover, the arrangement is distinguished by the fact that its design is ideal for retrofitting in existing double-wall housings. Existing housings can therefore be converted to the state-of-the-art technical safety status in a very simple manner.

The arrangement can also be used for highly bearing double-wall cabinet concepts.

The arrangement achieves self-monitoring in compliance with safety category 3. With this design, the transmitter/receiver unit is comprised of a number of self-monitoring receivers as well as an evaluation circuit with which a receiver signal can be continuously monitored and evaluated. A permanent automatic monitoring feature ensures proper function of the receiver at all times. The evaluation circuit is protected by the robust metal or plastic housing, preferably aluminum housing, to which the transmitter/receiver unit is directly attached. The sensors in this arrangement conform to the monitored status in compliance with protection class IP65.

The transmitters such as LEDs are arranged in such a manner that their radiation cone runs transverse as well as primarily perpendicular to the wall elements in each case and the receivers such as photodiodes are arranged on the jacket in such a manner that their reception cone runs at least approximately parallel to the wall elements. This ensures, on the one hand, reliable automatic monitoring and, on the other, certain reception of the radiation to be detected.

In one preferred version, a receiver is associated with each transmitter, whereby a transmitter/receiver pair is arranged diametrically opposing so that the automatic monitoring feature also includes reflections from walls, i.e. direct radiation is avoided.

Moreover, provisions have been made for connecting a number of detector arrangements in series on one cable route, whereby each arrangement has one input and one output. A terminal plug which connects the two emergency-off loops with the specific return line can be connected to an output socket on the last arrangement in the chain. As an alternative, a separate return line can be connected instead of the terminal plug.

Moreover, the invention provides for designing the housing as a modular system of cabinets, surrounding double-wall elements without filling materials and braces with an interval A in the range of 35 mm installed light-tight around the wall elements to prevent interfering signals.

A further feature of the arrangement is distinguished by the fact that a reference radiation can be generated by a generator connected to the transmitter, whereby the generator produces a code and/or modulation pattern for the radiation emitted by the transmitter in the wavelength range of the radiation to be detected, whereby the generator is connected to the evaluation circuit and the evaluation circuit compares the code and/or modulation pattern with the radiation received by the receiver and switches off the radiation to be detected when the code and/or modulation pattern is disrupted.

The invention fulfills this task by a method of the type mentioned at the beginning, in which the transmitter and the receiver are located in a defined sectional area between two walls forming the protective housing, whereby a modulated and/or coded radiation in the range of the radiation to be detected is generated by the transmitter as reference radiation and interference to the pattern of the modulated and/or coded radiation is evaluated as penetration of the radiation to be detected into the sectional area.

In contrast to the present state of the art, an active, electronic process is introduced here, which recognizes the optical radiation as interference to a reference signal, independently of the protective housing and its material and switches of the source very quickly in the event of a fault.

As an alternative, the arrangement in this invention is distinguished by the fact that in at least one limited sectional area, a transmitter is located for emitting a reference radiation produced by a generator connected with the transmitter in such a manner that the generator generates a code and/or modulation pattern for the radiation emitted by the transmitter in the wavelength range of the radiation to be detected, so that the generator is connected to the evaluation circuit and the evaluation circuit compares the code and/or modulation pattern with the radiation received by the receiver and switches off the radiation to be detected when the code and/or modulation pattern is disrupted.

After establishing that the pattern is changed, the optical radiation is switched off immediately.

Corresponding to a further preferred method, the invention provides for at least one receiver being connected in series with a filter, whereby the wavelength band $\lambda_2$ of the radiation received by the receiver is limited by $\lambda_2=\lambda_1\pm\Delta\lambda$, whereby $\lambda_1$ of the wavelength range is that of the radiation to be detected as well as that of the reference radiation.

The invention therefore describes an electronic method as well as arrangement for recognition of coherent (laser) and/or incoherent (LED) radiation in any protective wall system, consisting of at least two absorbing wall elements. The invention serves for protection against dangerous optical radiation outside of the housing area by means of active monitoring of the passive protective element using sensors. The system is laid out for maximum safety and can be retrofitted into present housings.

Based on the recognition of the absorption process of the protective wall material, the idea for the invention is that destruction of the inner protective wall is accepted as a part of the process. In this case, the laser radiation has penetrated through the first protective layer and the laser energy in use is concentrated, dispersed and/or focused in the inner chamber between the two wall elements. Optically sensitive sensors recognize this radiation as interference to the pulse or code pattern of the radiation from the transmitter and the result is evaluated and implemented accordingly. The signal obtained in this manner can be used for automatic fail-safe emergency switch-off of a laser system.

The duration for the heat-up and the propagation of the heat energy in the protective material is insignificant for detection of the radiation. Nor is it important which wall material is used or which degree of contamination is present on the surface.

The idea used for this invention makes it possible to retrofit nearly all existing double-wall protective housings with this system.

To avoid malfunctions resulting from scattered light or daylight, it is possible to limit the sensors to the wavelength range to be detected using appropriate filters.

The process, as well as arrangement of the sensors and receivers allows the sensors to be monitored at all times for technically perfect condition. For this purpose, the sensors are subjected permanently to modulated and/or coded radiation with the aid of low-energy radiation sources. The sensor signal is compared by electrical means (output, nominal value) as well as optical means (input, actual value) (double feedback). Only when the modulation and/or coding on both channels is identical, does the evaluation electronic circuitry remain in the active state (no malfunction detected). A fail-safe version of the electronic circuit (state of the art) guarantees an error message in the event of electronic or electrical failure (component, power supply, cable discontinuity, etc.).

Based on the descriptions above, the fault recognition according to the invention consists of the fact that the laser or other optical radiation penetrating into the intermediate space of the protective housing and corresponding to the wavelength range to be detected leads to a change in the pulse or code pattern of the sensor system, under all circumstances, and therefore triggers the safety circuit (e.g. dropout of a relay).

The described arrangement is equally suitable for continuous laser radiation as well as pulsed systems.

The possibility therefore also exists of designing the fail-safe electronic evaluation unit in such a manner that a desired cascadability is present. This is a primary prerequisite for linking any desired number of wall elements with one another or realizing a number of safety circuits (zones) in one system.

BRIEF DESCRIPTION OF THE DRAWINGS

Further details, advantages and characteristics of the invention are given in the claims, the characteristics to be concluded from these—alone and/or in combination—, as well as from the following description of the drawings of preferable execution examples.

Figures

FIG. 1 Sectional view of a sectional area with detector arrangement limited by two walls of a housing of a protective wall system, FIG. 2a, 2b Side view as well as top view of transmitter/receiver unit for detector arrangement, FIG. 3a, 3b Side view and top view of transmitter/receiver unit with radiation area of transmitter and receiver element illustrated, FIG. 4 Block diagram of incorporation of detector arrangement into safety control for overall system, FIG. 5 Block diagram of section of housing with transmitter and receiver and FIG. 6 Block diagram.

DESCRIPTION OF THE PREFERRED EMBODIMENTS

Figure 2B:
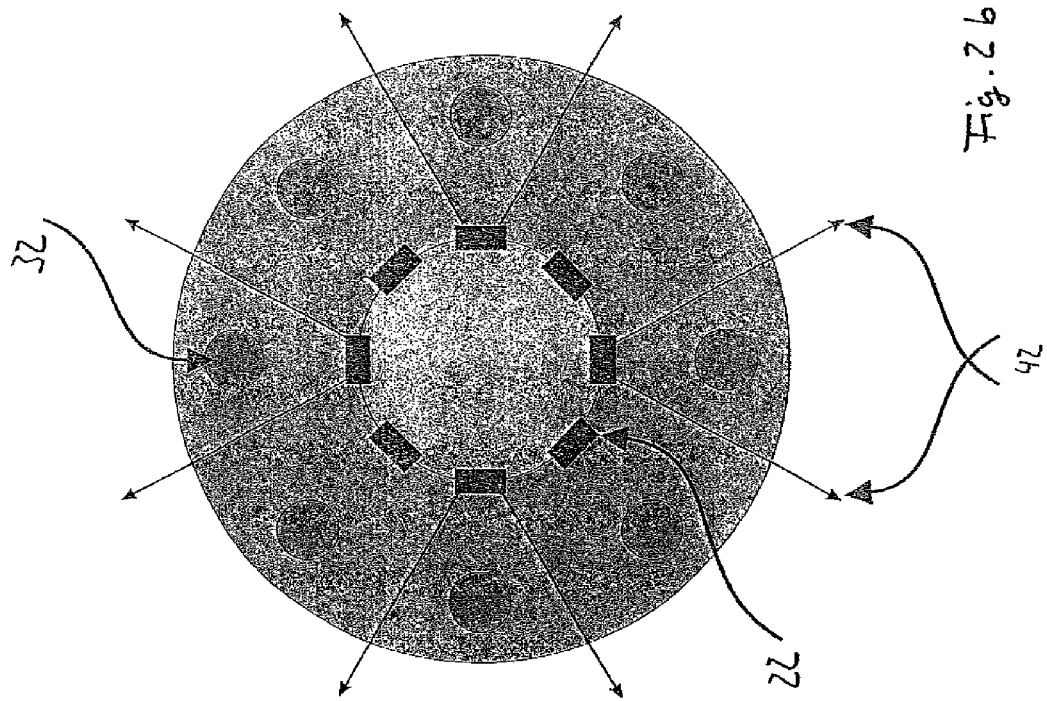

FIG. 1 shows a purely schematic sectional drawing of an arrangement 10 for detection of penetration of continuous or pulsed laser radiation 12 into a limited sectional area 20 limited by at least one of two walls 14, 16 of a housing 18 of a protective wall system. The walls 14, 16 are located at distance A within the range of approx. 35 mm from one another. At least one receiver 22 as well as photodiodes for detecting the radiation 12 is located in sectional area 20. At least one receiver 22 is connected to an evaluation circuit 24.

The arrangement is distinguished by the fact that it has a breach 26 in the outer wall 16 into which a transmitter/receiver unit is inserted. The transmitter/receiver unit 28 is comprised of a number of receivers 22, located on a cylindrical jacket 30 extending into the area 20 and surrounded concentrically by a number of transmitters 32 arranged in a circle.

The transmitter/receiver unit 28 located in area 20 is connected to the evaluation circuit, which is located outside area 20 on a housing 36 located on the exterior surface 34 of the outer wall 16. Here, the housing 36 and transmitter/receiver unit 28 form a compact assembly allowing easy installation on double-wall booth elements already in use. For this purpose, it is only necessary to provide for a breach 26 in the exterior wall 16, whereby the bottom 30 of the housing 36 is in contact with the outer surface 34 of the outer wall 16 and connected or screwed to the latter.

Figure 2A:
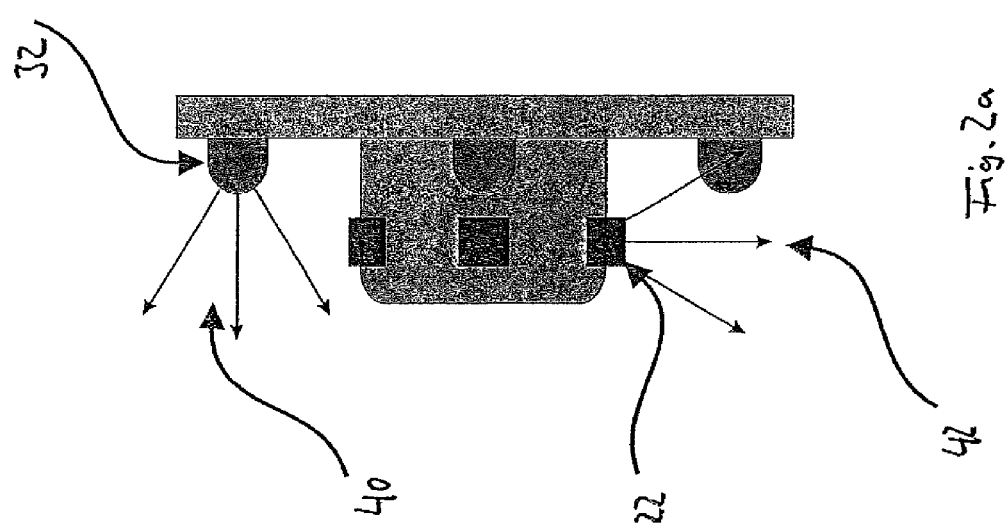

According to FIGS. 2a and 2b, the transmitters 32 are arranged in a circle and surround the receiving elements 22 concentrically, whereby each receiving unit 22 is associated with one transmitter element 32. In the present execution example, the transmitter/receiver unit has eight transmitters and eight receivers.

The receivers 22 are located in one plane running parallel at an interval to a plane in which the transmitters 32 are located. Moreover, the transmitters have radiation characteristic 40, which provides for a conical shape, and run primarily perpendicular to the external wall element, while the receiving elements have receiving characteristics 42 running primarily parallel to the external wall element 16.

Figure 3B:
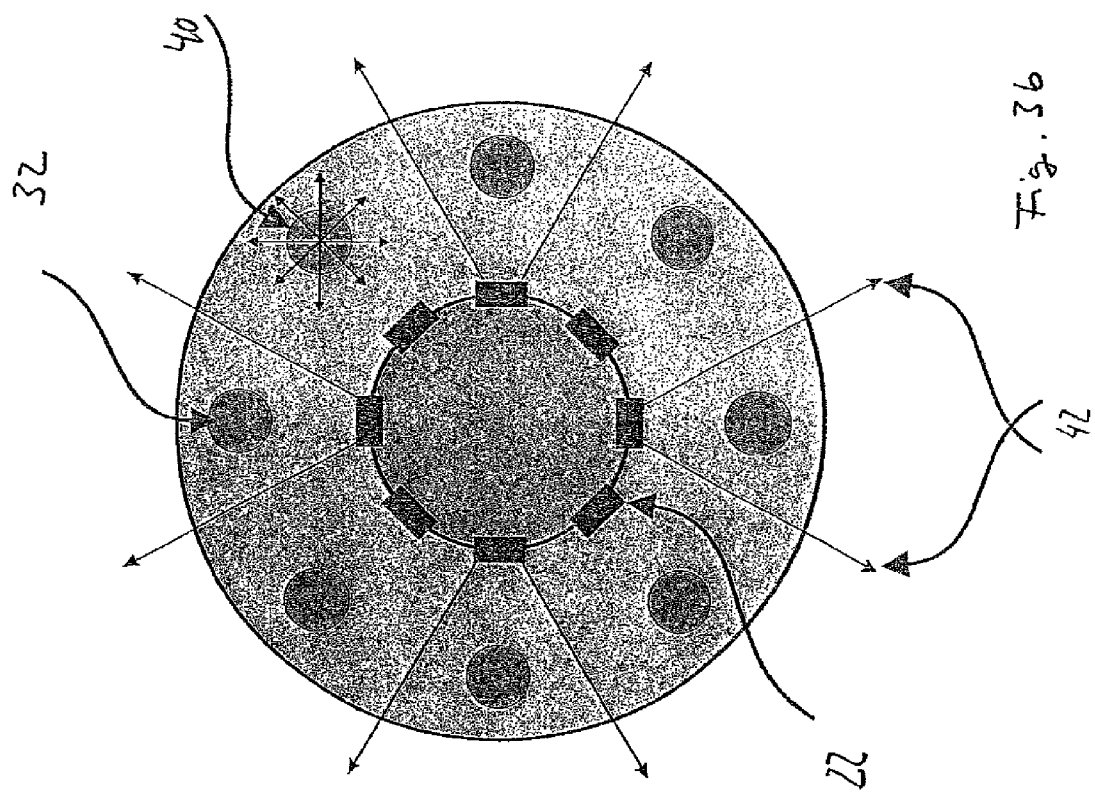
Figure 3A:
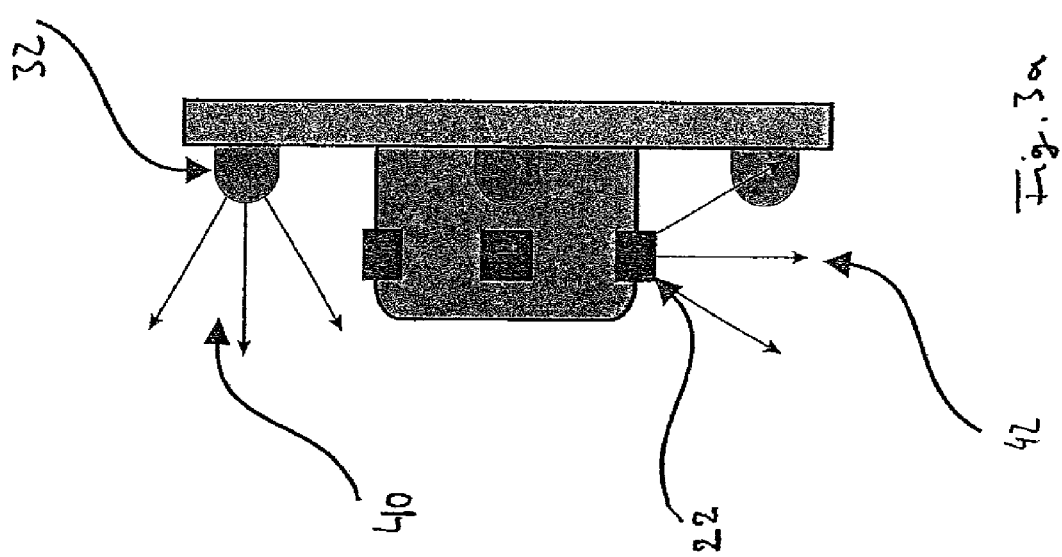

FIGS. 3a and 3b also show a radiation area 44 for the transmitter 28 as a top view, as well as the reception area of 42 of a receiver as top view.

Figure 4:
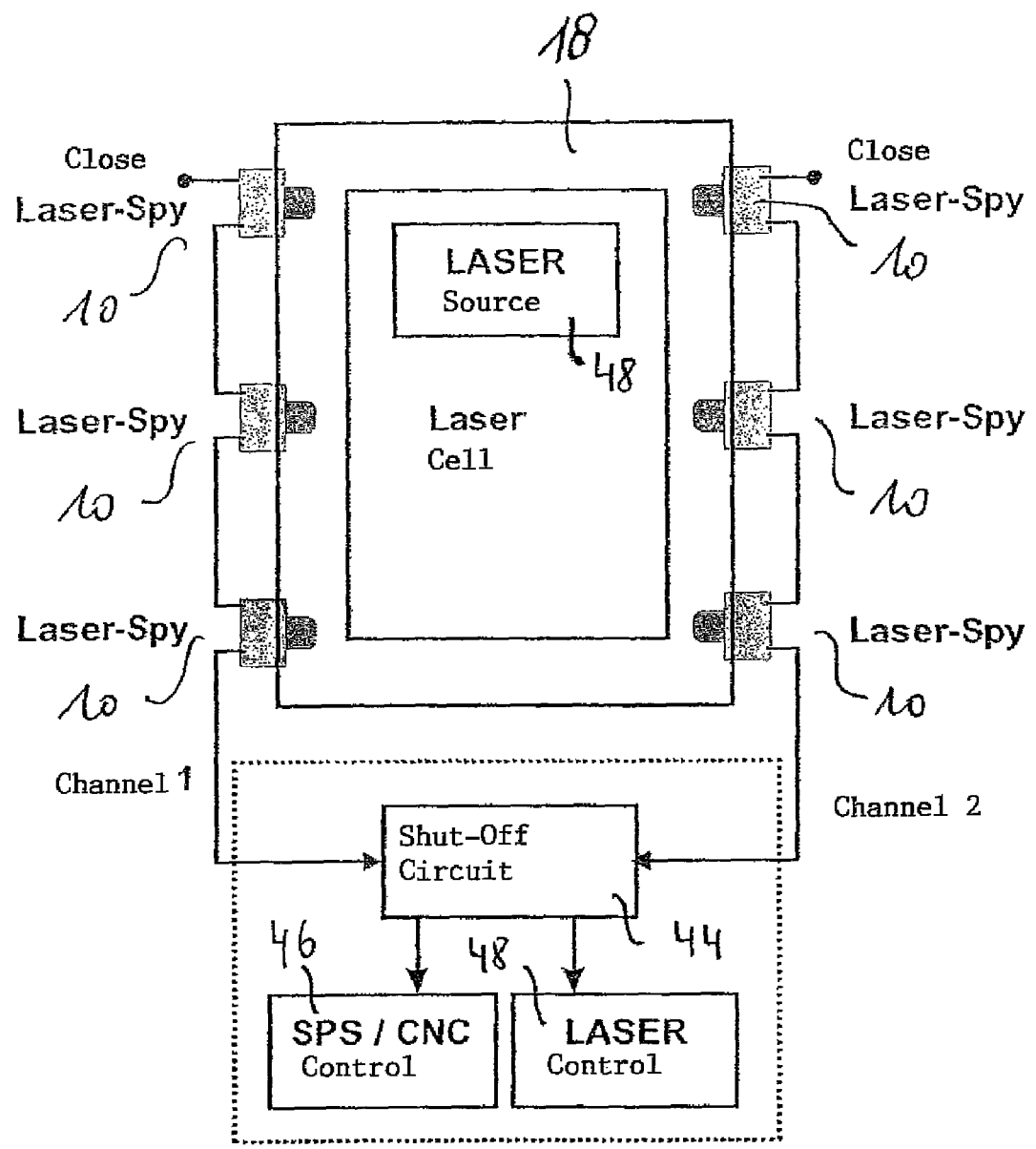

FIG. 4 shows a circuit diagram in which a detector circuit (laser spy) is connected to an emergency shut-off circuit 44 of a CNC control 46 for a laser assembly 48. The individual detector assemblies 10 are connected in series whereby 10 detectors, for example, can be connected in series per sensor string. For this purpose, each assembly has an input 48 as well as output 50 which can be connected to one another over prefabricated lines.

For installation only, a mounting hole 26 is required for the sensor core or sensor/receiver unit 28 as well as mounting holes for the sensor housing 36 to the wall 16 of the protective wall 18.

On the control side, various possibilities exist for connecting the detector assembly 10 into the safety mechanisms of the entire system such as, for example, connecting the individual strings to a quick switching safety switching device (PNOZ), which can be connected to the emergency-off circuit 44 of the radiation source or a connection to a safety SPC or a dedicated safety controller.

Each detector assembly 10 is designed with two channels and has an optical signaling feature consisting of two status LEDs to indicate the current status.

The assembly 10 operates according to a method in which various radiation sources 32 are located inside the sectional area 20 of the protective wall 18 of two plates (inner wall element 16, outer wall element 14) in such a manner that the radiation limited with a wavelength of $\lambda_1$ strikes various receivers located on a cylindrical jacket 22, in this example. For protection against extraneous radiation, filters can be connected in series with the receivers for limitation of the reception range to a wavelength band of $\lambda_2 = \lambda_1 \pm \Delta\lambda$. Whereby $\lambda_1$ should be close to the laser radiation to be detected.

A possible function of the electronic evaluation unit can be described as follows. Transmitter 32 is subjected to modulation and emits radiation with this modulation pattern. The signal from a generator is conducted electrically directly to the evaluation electronic circuit (feedback). The signal from receiver 28 is connected to the electronic evaluation circuit over a different input. The electronic evaluation circuit compares the modulation pattern from the generator with the signal from the receiver. If only radiation 40 with the generated modulation pattern is detected in area 20, the electronic evaluation circuit releases the laser device. If laser radiation 12 penetrates into the sectional area, for example following destruction of the inner protective wall 14, the modulation pattern is changed. This is accomplished regardless of whether the penetrating radiation is continuous or pulsed radiation. The evaluation circuit 24 then recognizes a significant difference between the nominal value fed back and the detected actual value. This results in an error message triggering an emergency shut off of the laser system.

Figure 5:
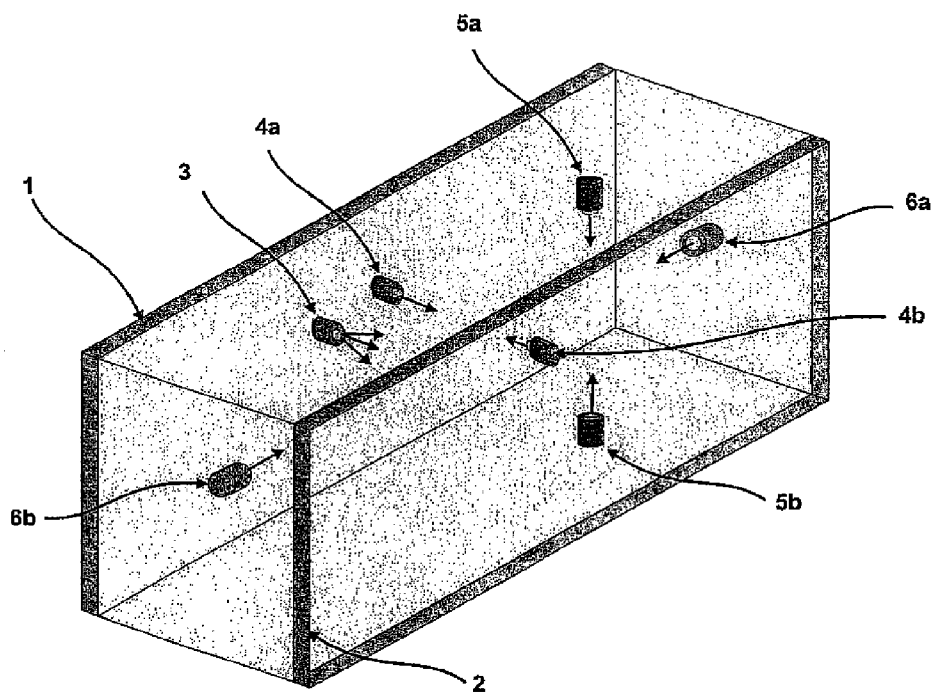

FIG. 5 shows a schematic representation of the method according to the invention in which various radiation sources (4a, 5a, 6a) are located inside a sectional area of a protective wall, consisting of two plates (inner wall element 2, outer wall element 1) in such a manner that the emitted radiation with a wavelength of $\lambda_1$ strikes various sensors (4b, 5b, 6b) located on the opposite side in this example. For protection against extraneous radiation, filters can be connected in series with the detectors for limitation of the reception range to a wavelength band of $\lambda_2=\lambda_1\pm\Delta\lambda$. Whereby $\lambda_1$ should be close to the laser radiation to be detected.

Figure 6:
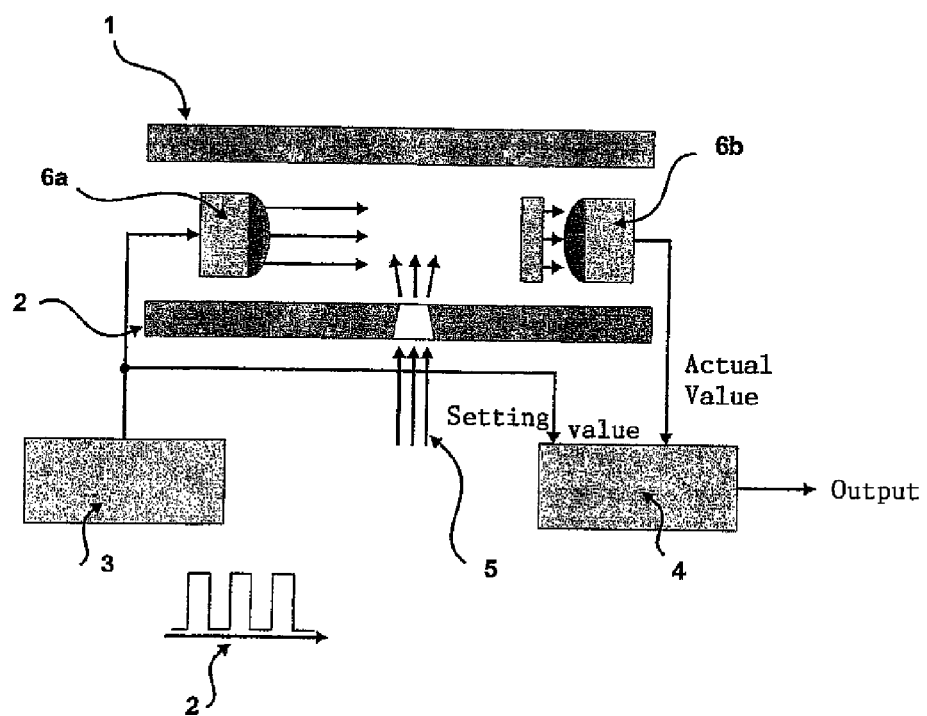

FIG. 6 shows a block diagram of the possible function of the electronic evaluation unit. Transmitter 6a is subjected to modulation 7 and emits radiation with this modulation pattern. The signal from generator 3 is conducted electrically directly to the evaluation electronic circuit 4 (feedback). The signal from receiver 6b is connected to the electronic evaluation circuit 4 over a different input. The electronic evaluation circuit 4 compares the modulation pattern 7 from the generator 3 with the signal from the receiver. If only radiation with the generated modulation pattern is detected in area, the electronic evaluation circuit releases the laser device. If laser radiation 5 penetrates into the sectional area, for example following destruction of the inner protective wall 2, the modulation pattern is changed. This is accomplished regardless of whether the penetrating radiation is continuous or pulsed radiation. The evaluation electronic then recognizes a significant difference between the nominal value fed back and the detected actual value. This results in an error message triggering an emergency shut off of the laser system.

The invention claimed is:

1. Arrangement for detecting penetration of continuous or pulsed laser radiation in a sectional area limited by at least one of two walls of a housing of a protective double-wall element system including at least one receiver constructed and arranged for detection of the radiation connected to an evaluation circuit, the sectional area being defined between an inner wall and an outer wall of the double-wall element of the protective wall system, the arrangement comprising a breach in the outer wall of the housing, the breach containing a transmitter/receiver unit, comprising a plurality of receivers located on the circumference of a tubular jacket, and a plurality of transmitters concentrically surrounding the receivers in a circle, each of said receivers having one of said transmitters assigned thereto for self-monitoring, the one of said transmitters assigned thereto being located diametrically opposite thereto, wherein the tubular jacket holding the receivers extends inside into the sectional area, and the transmitters are arranged concentrically in relation to the cylindrical jacket.

2. Arrangement according to claim 1, wherein the transmitter/receiver unit is located on a bottom of a housing containing the evaluation circuit, the bottom of the housing containing the evaluation circuit being in contact with the outer surface of the wall of the housing and fastened thereto, and wherein the tubular jacket for holding the receivers extends from the bottom of the housing containing the evaluation circuit.

3. Arrangement according to claim 1, wherein the receivers are located in one plane running parallel at a distance from a plane in which the transmitters are located.

4. Arrangement according to claim 1, wherein the transmitter/receiver unit is located on a bottom of a housing containing the evaluation circuit, the bottom of the housing containing the evaluation circuit being in contact with an outer surface of the wall of the housing and fastened thereto, and wherein the housing containing the evaluation circuit and the transmitter/receiver unit form a unit.

5. Arrangement according to claim 1, wherein the transmitters are located such that each produces a radiation cone running transversely as well as approximately perpendicularly to the walls and the receivers are arranged on the cylindrical jacket such that each has a receiving cone that runs parallel or at least parallel to the walls.

6. Arrangement according to claim 1, wherein a plurality of arrangements for detecting penetration of continuous or pulsed laser radiation are connected in series to a cable harness, each of said arrangements having one input and one output, and wherein a short circuiting plug is attached to the output of a last arrangement in the series, the short circuiting plug connecting two emergency loops with a specific feedback line or connecting to a separate feedback line.

7. Arrangement according to claim 1, wherein the protective wall system is designed as a modular booth system.

8. Arrangement according to claim 1, wherein the double-wall elements have no filling material or braces.

9. Arrangement according to claim 1, wherein the walls are designed light-tight to prevent interference signals.

10. Arrangement according to claim 1, additionally comprising a generator for generating reference radiation connected to the transmitter, the generator producing a code and/or modulation pattern for the radiation emitted by the transmitter in a wavelength range of radiation to be detected, and wherein the generator is connected to the evaluation circuit and the evaluation circuit is constructed and arranged to compare the code and/or modulation pattern with radiation received by the receiver and to switch off the radiation to be detected when the code and/or modulation pattern is disrupted.

11. Method for detecting laser radiation in at least one defined sectional area of a protective housing, the laser radiation being detected by a receiver supplied with reference radiation emitted by a transmitter, comprising:

locating the transmitter and the receiver in the defined sectional area between two walls of a double-wall element forming the protective housing, generating, by the transmitter, a modulated and/or coded radiation in a wavelength range of the radiation to be detected in the sectional area, as reference radiation and evaluating interference to the pattern of the modulated and/or coded radiation as penetration of the laser radiation to be detected into the sectional area, and immediately switching off the laser radiation after detection of a disturbance in the pattern, wherein at least one receiver is connected in series with a filter, and wherein a wavelength band $\lambda_2$ of the radiation received b the receiver is limited by $\lambda_2=\lambda_1\pm\Delta\lambda$, and wavelength $\lambda_1$ of the wavelength range is that of the radiation to be detected as well as that of the reference radiation.

12. Arrangement for detecting penetration of continuous or pulsed laser radiation in a sectional area limited by at least one of two walls of a housing of a protective double-wall element system in which at least one receiver is located for detection of the radiation and the receiver is connected to an evaluation circuit, comprising in the at least one limited sectional area which is defined between two walls of the double-wall element system, a transmitter for emitting a reference radiation produced by a generator connected with the transmitter such that the generator generates a code and/or modulation pattern for the radiation emitted by the transmitter in the wavelength range of the radiation to be detected, the generator being connected to the evaluation circuit and the evaluation circuit is constructed and arranged to compare the code and/or modulation pattern with the radiation received by the receiver and to switch off the radiation to be detected when the code and/or modulation pattern is disrupted, and
wherein at least one receiver is connected in series with a filter, and
wherein a wavelength band $\lambda_2$ of the radiation received by the receiver is limited by $\lambda_2 = \lambda_1 \pm \Delta\lambda$, and $\lambda_1$ is a wavelength range of radiation to be detected as well as that of the reference radiation.

\* \* \* \* \*